United States Patent [19]

Riti

[11] 4,291,439

[45] Sep. 29, 1981

[54] KNOT SECURING DEVICE

[76] Inventor: Alfred A. Riti, 61 Bronx River Rd., Yonkers, N.Y. 10701

[21] Appl. No.: 49,936

[22] Filed: Jun. 18, 1979

[51] Int. Cl.$^3$ .................. F16G 11/00; F16G 11/10
[52] U.S. Cl. ........................................ 24/119; 24/204
[58] Field of Search ............... 24/119, 117, 118, 120, 24/121, 204; 36/50, 51, 54

[56] References Cited

U.S. PATENT DOCUMENTS

| | | | |
|---|---|---|---|
| 528,464 | 10/1894 | Craig | 24/119 |
| 2,871,537 | 2/1959 | Hickerson | 24/117 |
| 3,940,873 | 3/1976 | Lawless | 24/204 |
| 4,114,297 | 9/1978 | Famolari, Jr. | 36/50 |

FOREIGN PATENT DOCUMENTS 4256 of 1903 United Kingdom .................. 26/119

Primary Examiner—Roy D. Frazier
Assistant Examiner—Alexander Grosz
Attorney, Agent, or Firm—H. M. Snyder

[57] ABSTRACT

A knot-securing device for the laces of shoes and other laced articles comprises a strap having adjoining surfaces of hook and loop elements. The strap is positioned to surround and contact the knot when the hook surface is brought into contact with the loop surface. An anchoring element may be fixed to the device to secure it to a lace.

4 Claims, 2 Drawing Figures

KNOT SECURING DEVICE

This invention is directed to a novel strap device for securing or locking the knots of bow-knots used to tie laces.

Professional athletes, joggers, young children and, in fact, all who wear shoes are oftentimes faced with the annoyance of bow-knots which become untied at inconvenient and hazardous times.

The present invention offers a simple, inexpensive means for locking bow-knots in place.

It is the object of this invention to provide a strap device utilizing readily available woven hook and loop fastening tape for securing bow-knots.

Other objects and advantages of the invention will become apparent from the following description taken in conjunction with the accompanying drawing in which.

In accordance with this invention, the device for securing bow-knots comprises a strap of flexible material, said strap having on one side thereof regions of hook and loop elements, a first of said regions extending from one end of said strap toward the middle thereof comprising a field of hook elements and a second of said regions extending from the other end of said strap toward the middle thereof comprising a field of loop elements. The strap is provided with an anchoring element which comprises a flap of material fixed to the strap proximate the middle thereof and extending outwardly in the plane of the strap. The flap is perforated to receive a lace and so secure it in position for use.

Figure 1:
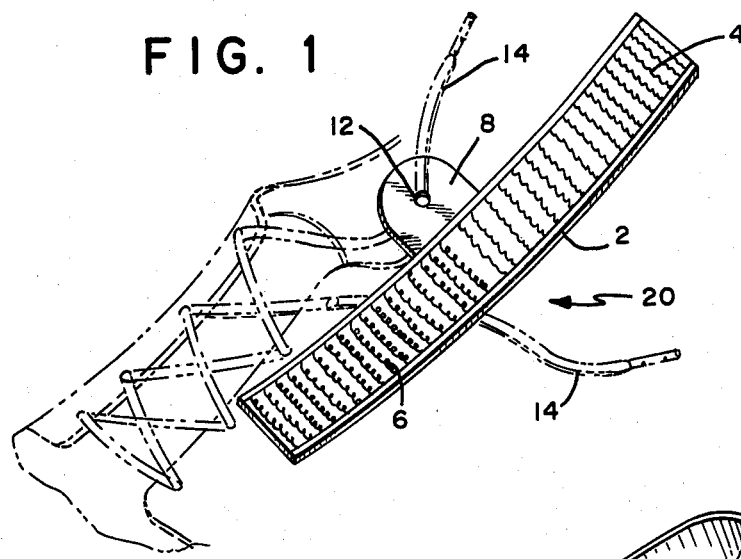
FIG. 1 is a perspective view of the strap device of the invention.

Referring to the drawings, the strap-like knot-securing device 20 is shown in FIG. 1 with the flexible strap 2 having on one side thereof a first surface region or field 4 comprised of hook elements adjoining a second surface region or field 6 comprised of loop elements.

At the middle of device 20 an anchoring element 8 is provided which is a flap of flexible material having a perforation 12 therein. As illustrated, a lace 14 may be threaded through perforation 12 to fix the knot-securing device 20 in proximity to the site at which it is to be utilized.

Figure 2:
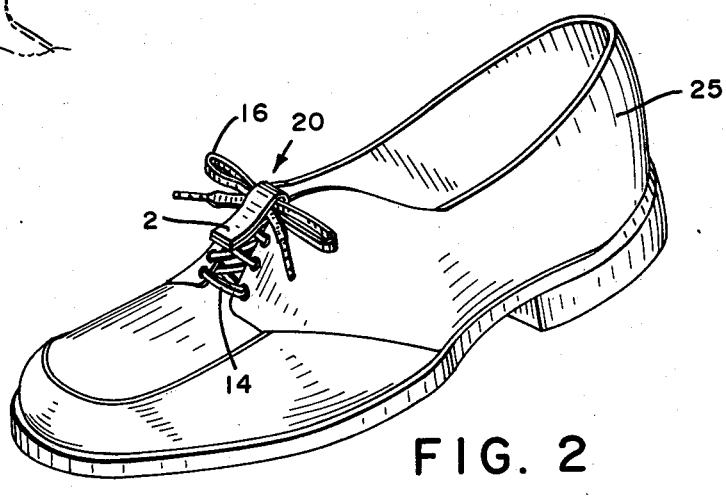
FIG. 2 is a perspective view of the strap device of the invention in locking position on the bow-knot of a laced and tied shoe.

In FIG. 2, the knot-securing device 20 is shown in operative position, securing the bow-knot 16 of shoe 25. Thus, the strap 2 has been folded tightly over the knot of bow-knot 16 to bring the surface or field 4 of strap 2, with the hook elements thereon, into fastening contact with surface or field 6 of strap 2, which is provided with loop elements thereon.

Once the hook and loop fields are in fastening contact, the locked strap ends resist forces in shear and tension. The frictional contact of strap 2 with the knot, when doubled over tightly about the knot as in FIG. 2, strongly resists movement of the knotted lace.

In utilizing the knot-securing device of the invention as shown in FIG. 1, the device is run down the lace 14 until the flap 8 is close to the eyelet through which lace 14 passes. In this position, the hook and loop fields on the strap face outwardly. With the bottom half of the strap 2 lying on the laced portion of the laces, and the upper half of the strap extending upward at ankle height, the laces are tied in the usual bow-knot on strap 2 so that the bow-knot draws the strap against the shoe; the strap thus lying between the bow-knot and the tongue of the shoe, with the bow-knot located at about the middle of the strap. The ends of the strap can now be drawn together and the hook and loop fields engaged, first at the outer ends of the strap and then close to the middle of the strap so as to draw the strap tightly about the center knot of the bow-knot (see FIG. 2). The frictional contact of the strap and the knot will greatly limit accidental untying of the knot. On the other hand, the knot can be readily freed by pulling the ends of the strap 2 apart.

A strap material especially suitable for use in the manufacture of the device of this invention is commercially available in the form of fastening tapes, sold under the name of VELCRO woven nylon hook and loop fasteners, manufactured by VELCRO U.S.A., Inc. of New Jersey. The hook tape is a woven nylon tape provided with aligned, minute flexible hooks secured to the ground weave by an elastomeric binder coat. The loop tape is similar to the hook tape except that, instead of hooks, a mat composed of hundreds of small, soft loops is bonded to the ground weave.

In manufacturing the device of the present invention, a length of hook tape, perhaps about two inches long, is secured in end-to-end relation to a similar length of loop tape, with the hook and loop elements on the same side of the joined strap. The lengths of tape may be joined by any suitable means, such as stitching, stapling or heat bonding.

Near the center of the joined tape an anchoring element may be provided which extends outward in the plane of the tape. The anchoring element, which may be a leather, plastic or fabric flap, is secured to the strap by stitching or by other appropriate means. In some cases, the anchoring element can be employed as an element joining the hook tape to the loop tape, and joined to each of these, by stitching or otherwise. The anchoring element, as described previously, is perforated to admit one lace and thereby secure the device at, or very close to, the operative position.

While the joinder of hook and loop tapes as described is a simple way to manufacture this device, it will be evident that any flexible material such as leather, rubber, fabric or plastic strapping may be used as a backing material and short lengths of hook and loop tapes may be secured by means such as adhesives, heat bonding or mechanical joinder to the backing material to form the knot-securing device of the invention.

Although the invention has been described with particular reference to bow-knots used in lacing shoes, it will be appreciated that other articles which are commonly laced, such as jackets and blouses, may have the bow-knots thereof secured by the device of the invention. Thus, while the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the inventions and appended claims.

I claim:

1. A device for securing bow-knots comprising,
a strap of flexible material,
said strap having on one side thereof regions of hook and loop elements, a first of said regions extending from one end of said strap toward the middle thereof, comprising a field of hook elements, a second said regions, extending from the other end of said strap toward the middle thereof, comprising a field of loop elements, said first and second regions being adopted to be brought into fastening contact with each other by folding said strap about the middle thereof and an anchoring element provided at about the middle of said strap and fixed thereto, said anchoring element extending outwardly in the plane of said strap and having a perforation therein to receive a lace.

2. The device for securing bow-knots as set forth in claim 1 wherein said anchoring element is formed of a flexible material.

3. The device for securing bow-knots as set forth in claim 1 wherein said anchoring element is secured to said first and second regions at about the middle of said strap.

4. A device for securing bow-knots comprising a strap of flexible material having on one side thereof regions of hook and loop elements, a fold zone on said strap between said regions, a first of said regions comprising a field of hook elements extending from one end of said strap toward the fold zone, a second of said regions comprising a field of loop elements extending from the other end of said strap toward said fold zone, said strap being foldable at said fold zone to bring said first and second regions into fastening contact with each other, a bow-knot receiving strap portion proximate said fold zone, said strap having an anchoring element extending outwardly in the plane of said strap adjacent said fold zone, said anchoring element being formed of a flexible material and having a perforation therein to receive a single lace.

* * * * *